(12) United States Patent
Prewitt (10) Patent No.: US 6,415,197 B1
(45) Date of Patent: Jul. 2, 2002

(54) METHOD OF DISPLAYING CHARACTERISTIC PARAMETERS IN A TIRE MANUFACTURING CELL

(75) Inventor: William Thomas Prewitt, Tallmadge, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/486,842
(22) PCT Filed: Oct. 8, 1997
(86) PCT No.: PCT/US97/18232
§ 371 (c)(1), (2), (4) Date: Mar. 2, 2000
(87) PCT Pub. No.: WO99/17919
PCT Pub. Date: Apr. 15, 1999

(51) Int. Cl.⁷ .............................................. G06F 19/00
(52) U.S. Cl. .......................... 700/117; 73/146; 702/187
(58) Field of Search .................. 700/95, 117, 197–199; 702/187, 157; 73/146

(56) References Cited

U.S. PATENT DOCUMENTS

| | | | |
|---|---|---|---|
| 4,095,374 A | 6/1978 | Ugo | 451/1 |
| 4,134,292 A | 1/1979 | Honlinger et al. | 73/146 |
| 4,171,641 A | 10/1979 | Landness | 73/146 |
| 4,434,652 A | 3/1984 | Christie | 73/146 |
| 5,309,377 A | 5/1994 | Beebe | 702/105 |
| 5,347,588 A | 9/1994 | Wilson | 382/104 |
| 5,365,781 A | 11/1994 | Rhyne | 73/146 |

FOREIGN PATENT DOCUMENTS

| | | |
|---|---|---|
| EP | 0492170 | 7/1992 |
| GB | 2136997 | 9/1984 |

OTHER PUBLICATIONS

Peshek, C.J. et al. Advanced Control System for Automatic Tire Building Apr. 10, 1989 Proceedings of the Annual Conference of Electrical Engineering Problems in the Rubber and Plastics Industries, Akron, Apr. 10–11, 1989 NR Conf. 41, pp. 93–102, Institue of Electrical and Electronics Engineers XP000079828.

*Primary Examiner*—Leo Picard
*Assistant Examiner*—Zoila Cabrera
(74) *Attorney, Agent, or Firm*—Howard M. Cohn

(57) ABSTRACT

A self-contained tire-manufacturing cell (100) has linked build, cure, and force-measurement equipment. Each tire is tagged (personalized), such as with a bar code, so that it can be traced through the system, including which one of a number of build drums it was built upon, which one of a number of mold cavities it was cured in and which one of a number of force variation testing machines it was tested on. The system performs force, measurements upon each tire after curing, in near real time after the tire is produced, and displays this information in a graphical symbolic format (300), from which process variations can readily be ascertained by the operator. In an exemplary embodiment, the force measurements are presented to the operator in the form of a polar plot (300), each circular band or ring of which is associated with an individual tire. The visual appearance of the band varies in shading, color, or the like, as a function of force-measurement data at various circumferential positions on the tire, each distinct shading, coloring, or the like representing a predetermined range of data (i.e., within a first range, within a second range, within a third range, etc.).

12 Claims, 4 Drawing Sheets

| Tire # 1234567 | Code ULVH3 | Defect: Lateral | Dispos: Downstream | |
|---|---|---|---|---|
| Radial | Lateral | | | |
| P-P 15.2 | P-P 16 | Conicity -1.2 | Build Drum #1 | 21:12 |
| 1st Harm 5.4 | 1st Harm 6.4 | Runout 0.005 | Cavity #3 | 21:25 |
| 2nd Harm 0.4 | | | FVM #2 | 21:27 |
| 7th Harm 0.4 | | | | |

400

METHOD OF DISPLAYING CHARACTERISTIC PARAMETERS IN A TIRE MANUFACTURING CELL

BACKGROUND OF THE INVENTION

The present invention relates generally to the manufacture of pneumatic tires and, more particularly to method and apparatus for determining variations attributable to various manufacturing processes in a tire manufacturing cell, so that these variations can be minimized.

It is known in the tire and automobile industries that vehicle ride is generally a function of a number of uniformity characteristics which may be measured for tires. One of the most significant influences on tire ride is affected by the first harmonic radial and lateral force variations of a tire. The first harmonic radial force variation is often associated with "radial runout" of the tire. Radial runout is defined as a difference in the radius of the tire from its axis of rotation to the outer periphery of the tire tread around the tire and may sometimes be corrected by grinding the tread rubber about the outer circumference of the tire. Radial runout may be determined by placing the finished tire in a testing machine, such as a force variation machine (FVM), which tests the tire for radial force variation as well as number of other uniformity characteristics which may be measured for tires. For example, another uniformity characteristic test which may be performed by a FVM on the tire is a test for conicity. Conicity is defined as the tendency of a rotating tire to generate a lateral force regardless of the direction of rotation of the tire. Generally, if a measured uniformity characteristic has a magnitude which is less than a predetermined lower threshold magnitude, the tire may be shipped, for installation on a vehicle. If the uniformity characteristic exceeds a predetermined upper threshold magnitude, the tire is scrapped. If the uniformity characteristic is between the lower and upper thresholds, the tire may (or may not) be corrected, for shipment and installation on a vehicle.

A typical pneumatic tire is manufactured by assembling beads, carcass plies, reinforcing members, tread rubber and sidewall rubber on a build drum. The assembled parts are inflated to form a "green" tire. Then, the "green" tire is carried from the building machine and inserted into a mold cavity for molding and curing. Pressure and heat, applied to the tire in the mold, may permanently distort the mold cavity. These distortions will be reflected in the tires manufactured with the distorted build drum and/or mold cavity. Other distortions can be caused by manufacturing variations in the molds, how the mold is mounted on the press, and variations in squeeze forces used to close the mold halves in the press. Still other distortions can be caused by differences in the constructions.

After the tire is assembled and cured, the tire is typically tested for one or more uniformity characteristics, such as by mounting the finished tire in a FVM and then inflating the tire and spinning it. The tire rubber is next ground off within the FVM in accordance with the signals generated in response to the uniformity characteristic being tested. One uniformity characteristic test which is typically performed on a finished tire is a test for radial force variation. In the radial force variation test, the finished tire is rotated in the FVM while a test wheel is pressed against the tread of the tire. Sensors in the FVM provide data indicative of the radial force exerted by the tire at each of a plurality of circumferential positions of the tire. Radial force variation can be represented by, for example, a combination of first harmonic radial force variation through an Nth harmonic radial force variation or a composite radial force variation, the Nth harmonic is the last harmonic in a Fourier Series analysis of the composite radial force variation which is deemed acceptable to accurately define the radial force variation.

A prior art system for correcting tire uniformity without grinding is described in U.S. Pat. No. 5,365,781. Sensors detect variations in characteristic parameters of a finished tire such as radial force. The radial force variation as a function of circumferential position on the tire is presented graphically as a waveform with one of the graph axes being circumferential position and another of the graph axes being radial force variation. Based on this information, the cured tire is "corrected" by permanently deforming at least one carcass reinforcing member a predetermined amount as a function of the magnitude and location (circumferential position) of the uniformity characteristic which was measured.

Another prior art system for improving tire uniformity grinding and measuring is described in U.S. Pat. No. 4,095, 374. In this patent, a lateral force related to conicity is measured while the tire is being corrected by grinding for radial force variation.

A prior art tire testing apparatus is described in U.S. Pat. No. 4,134,292. In this patent, radial and lateral force are measured simultaneously at several locations on the rotating tire, and these measurements are combined to correct for the inducted disturbance of the lateral force measurement caused by the radial force.

Another prior art system for measuring uniformity of tires is described in U.S. Pat. No. 4,171,641, wherein imbalanced forces are measured and then removed from the final forces produced by a high-speed tire to give a final readout of forces which are the true dynamic road wheel contact forces on a tire under load.

Another tire testing apparatus is described in U.S. Pat. No. 5,309,377 wherein a tire uniformity inspection machine is calibrated by applying to at least one force-measuring channel thereof a signal which simulates the application of a force which is preferably of a magnitude appropriate to simulate the largest forces expected to be encountered during actual tire testing, measuring the results, and determining an appropriate calibration factor. This patent clearly illustrates a testing machine which has sensors (transducers, strain gauges) and a signal processing network, as well as a central processing unit (CPU), a display such as a cathode ray tube (CRT) and a keyboard for interacting with the signals produced by the sensors.

Another tire testing apparatus which includes video imaging is described in U.S. Pat. No. 5,347,588. This patent generates and presents to the user a video image of a tire contact patch or footprint which may be used to analyze the tire construction, operation, noise generation and performance.

The present invention advantageously employs any of the aforementioned testing and measuring processes, which are incorporated by reference herein. It should, however, clearly be understood that the present invention is directed principally towards modifying the tire-building processes (e.g., cure, mold) themselves so as to "prevent" tires from failing uniformity test(s), in marked contrast to techniques of the prior art which are directed towards "correcting" (fixing) already-cured tires, or calibrating test equipment.

Prior art systems generally lack the capability of providing an operator with timely feedback about how the various processes are working, except in the case of serious process defects. Feedback is typically delayed due to long process queues and transportation delays, and the information contained in consecutive measurements of tires originating from a particular piece of equipment will be lost if it is not traced.

OBJECTS AND SUMMARY OF THE INVENTION

It is an object of the present invention to provide method and apparatus for providing an operator with feedback about the operation of various processes and equipment in a tire manufacturing cell, the method and apparatus being as defined in one or more of the appended claims and, as such, having the capability of being constructed to accomplish one or more of the following subsidiary objects.

It is another object of the present invention to provide method and apparatus for providing an operator with feedback about the operation of various processes and equipment in a tire manufacturing cell, which overcome the disadvantages and limitations of the prior art methods and devices.

It is a further object of the present invention to provide method and apparatus for graphically displaying force measurements to operators of tire building and curing machines in real time.

It is a still further object of the present invention to provide method and apparatus for correlating the angular position of force variation exceptions to the angular position of the tire producing drum or tire mold cavity.

It is a yet further object of the present invention to provide method and apparatus for providing data to the operator(s) in a sorted manner.

It is a yet further object of the present invention to provide method and apparatus for normalizing the displayed data for the influence of other parts of the process.

In accordance with the invention, a self-contained tire-manufacturing cell has linked build, cure and force-measurement equipment. Each tire is tagged (personalized), such as with a bar code, so that it can be traced through the system, including which one of a number of build drums it was built upon, which one of a number of mold cavities it was cured in, and which one of a number of force variation machines it was tested on.

Further in accordance with the invention, the system performs force measurements upon each tire after curing, and provides operators with radial force measurements shortly after a tire is produced, and displays this information in a graphical symbolic format, from which process variations can readily be adduced by the operator.

In an exemplary embodiment of the invention, the force measurements for a produced tire are presented to the operator in the form of a circular band or ring on a display (video) terminal. Different angular portions of the ring are presented in different colors, as a function of force-measurement data, each color representing a predetermined range of data (i.e., within a first range, within a second range, within a third range, etc.).

In accordance with this exemplary embodiment of the invention, display data for a number of tires is presented as a sequence of a number (e.g., eight) of concentric rings on the display terminal. Preferably, the outermost ring represents the most recently produced tire, and the innermost ring represents the least recently produced tire in the sequence of tires for which data is graphically being displayed. As a new ring is added to the outside of the display of concentric rings, illustrating data for a new tire, previous rings are shrunk and the innermost ring disappears.

In accordance with an alternate embodiment of the invention, the feedback process display could be in the visual form of stacked colored bars, rather than rings, or in other configurations that may be desired.

In accordance with the invention, the operator can use a cursor to select a given one of the number of displayed rings or bars to display detailed data for the tire in numeric form. This display can also show captured process information from the other machines in the process of building that tire.

DESCRIPTION OF THE DRAWINGS

The structure, operation, and advantages of the present preferred embodiment of the invention will become further apparent upon consideration of the following description taken in conjunction the accompanying drawings, wherein.

DETAILED DESCRIPTION OF THE INVENTION

Figure 1:
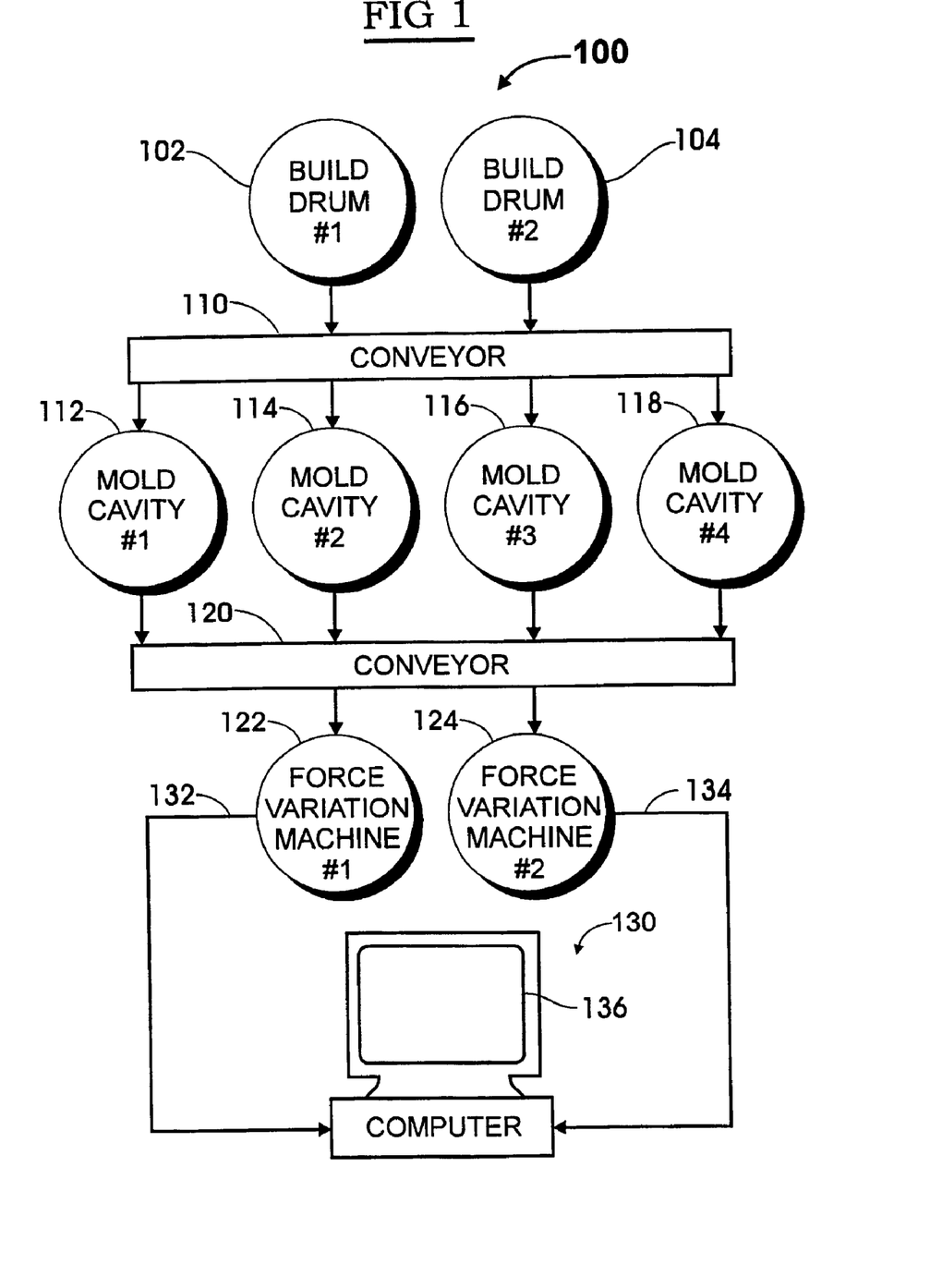
FIG. 1 is a block diagram of a tire manufacturing cell of the invention, including a computer terminal and a monitor.

FIG. 1 shows a tire manufacturing cell 100 having a number (two shown) of build drums 102 and 104, a number (four shown) of mold cavities 112, 114, 116 and 118, a number (two shown) of force variation machines 122 and 124 and a computer 130 controlling the operation of the build drums, cure mold cavities and force variation machines and the processes occurring therein.

A pneumatic tire is manufactured by assembling beads, carcass plies, reinforcing members, tread rubber and sidewall rubber on one of the two build drums 102 and 104, and the completed "green" tire is conveyed from the build drums to one of the four mold cavities 112, 114, 116 and 118 by a conveyor 110 where the assembled components of the tire are molded and cured.

Once the tires are molded and cured, they are conveyed by another conveyor 120 to one of the two force variation machines 122 and 124 for testing the uniformity characteristics of the cured tire. An exemplary uniformity characteristic test which is performed on the molded and cured tire is a test for radial force variation.

The operation of the build drums 102 and 104, the mold cavities 112, 114, 116 and 118, the force variation machines 122 and 124, and the conveyors 110 and 120 are suitably under control of a microprocessor-controlled control system, such as an appropriately-programmed personal computer 130. The programming of such a computer 130 to schedule, execute and record the various tasks occurring within the cell 100 are well within the grasp of one having ordinary skill in the art to which the present invention most nearly pertains, in light of the teachings presented herein.

Each tire that is manufactured in the cell 100 is provided with a unique tracking number, for example in the form of a bar code applied to the tire (e.g., to a label applied to the tire). This too is well within the grasp of one having ordinary skill in the art to which the present invention most nearly pertains, in light of the teachings provided herein.

As each of a plurality of tires progress from station-to-station, for example from the build drum 102 to the mold cavity 114 to the force variation machine 124, it's manufacturing "history" is recorded by the computer 130, such as by recording data into a database (or spreadsheet) program. For example, tire number "1234567" was assembled on Build Drum #1 (102), was molded and cured in Mold Cavity #2 (114) and was tested on Force Variation Machine #2 (124). Other relevant data such as information related to materials used in the construction of the tire and/or other machines used to assemble and/or mold the tire and/or the operator who assembled the tire on the build drum or who operated the mold cavity or the force variation machine and/or environmental factors present at the time (e.g., ambient temperature) can also be stored with each tire's "personal profile record" in the computer 130.

As mentioned above, each tire that is manufactured in the manufacturing cell 100 will have its own individual characteristic parameters, such as radial runout which may be tested, for example, on a force variation machine. It is a key to the efficacy of the present invention that these characteristic parameters are determined as soon as possible after building the tire so that process and/or equipment changes can be made, if necessary, to ensure that yield is optimized. For example, it is of little value to have 1000 defective tires produced because a one of the molding cavities has become defective. To ensure rapid response to process variations resulting in defective tires, the computer 130 gathers characteristic data from the measuring equipment (e.g., from the force variation machines 122 and 124) as signals on the lines 132 and 134 and presents this information to the operator in a "user-friendly" graphical format on the computer monitor 136, rather than in the often difficult to interpret form of raw data, waveforms or printed input.

Figure 2:
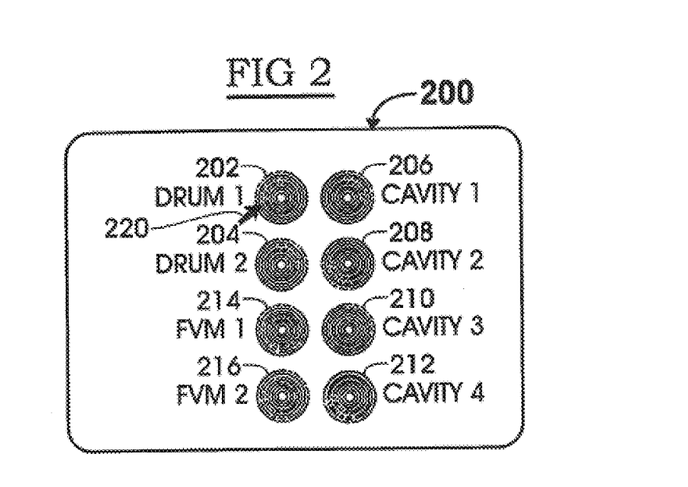
FIG. 2 is a facsimile of an exemplary image such as would be displayed on the monitor of the system of FIG. 1.

FIG. 2 illustrates an exemplary image 200 such as would be displayed and viewed on the monitor 136. The image 200 is in the form of a plurality of polar (circular coordinate) plots, each polar plot displaying characteristic data (e.g., radial force variation, lateral force variation) for a number of tires. The characteristic data which is presented can be the raw force measurements from tires known to have been processed at this point or raw force measurements from tires processed at this point less the statistical force contribution from the other processing devices, which were used. A number (e.g., eight) of polar plots are shown, and correspond to the number of build drums, mold cavities, and force variation machines within the cell 100, generally including each and every component of interest within the cell 100. Due to the number of polar plots appearing on the screen image 200, each polar plot is in the form of a "thumbnail" image. The polar plot 202 displays characteristic data for a number (e.g., eight) of tires which were assembled on Build Drum #1 (102). The polar plot 204 displays characteristic data for a number (e.g., eight) of other tires which were assembled on Build Drum #2 (104). The polar plot 206 displays characteristic data for a number (e.g., eight) of tires which were molded and cured in Mold Cavity #1 (112), which may have been assembled either on Build Drum #1 (102) or on Build Drum #2 (104). The polar plot 208 displays characteristic data for a number (e.g., eight) of other tires which were molded and cured in Mold Cavity #2 (114), which may have been assembled either on Build Drum #1 (102) or on Build Drum #2 (104). The polar plot 210 displays characteristic data for a number (e.g., eight) of other tires which were molded and cured in Mold Cavity #3 (116), which may have been assembled either on Build Drum #1 (102) or on Build Drum #2 (104). The polar plot 212 displays characteristic data for a number (e.g., eight) of other tires which were molded and cured in Mold Cavity #4 (118), which may have been assembled either on Build Drum #1 (102) or on Build Drum #2 (104). The polar plot 214 displays characteristic data for a number (e.g., eight) of tires which were tested on Force Variation Machine #1 (122) which may have been molded and cured in any of Mold Cavity #1 (112) or in Mold Cavity #2 (114) or in Mold Cavity #3 (116) or in Mold Cavity $4 (118). The polar plot 216 displays characteristic data for a number (e.g., eight) of other tires which were tested on Force Variation Machine #2 (122) which may have been molded and cured in any of Mold Cavity #1 (112) or in Mold Cavity #2 (114) or in Mold Cavity #3 (116) or in Mold Cavity #4 (118).

According to an embodiment of the invention, the polar plots 202–216 are formatted in the following manner. The characteristic data for each tire is presented in the form of a ring. Note that each of the polar plots 202–216 has eight concentric rings, representative of characteristic data for as many as eight different tires.

The rings of the polar plots are encoded in a visually readily-distinguishable manner, such as with grey tones, cross-hatching or color. For example, characteristic data in a first range of values is presented in the color BLUE. Data in a second range of values is presented in the color GREEN. Data in a third range of values is presented in the color YELLOW. Data in a fourth range of values is presented in the color RED.

The polar plots 202–216 on the screen image 200 are shown in greyscale, for illustrative clarity. Portions of the rings of the polar plots that are darkened represent characteristic data that is within a predetermined range of values, other portions of the rings that are not darkened (shown as discontinuities in the rings) representing characteristic data that is without the predetermined range. Ideally, all of the rings in each of the polar plots would be continuous rings without any perceptible discontinuities, meaning that the characteristic data for all of the tires represented in a given polar plot is within tolerance.

In the illustration of FIG. 2, the rings of the polar plots are shown as being black and white, and segmented, for illustrative clarity. For example, the outer ring on the polar plot 202 ("DRUM 1") has 6 segments. One segment spans approximately 270° of the circumference of the ring, is solid black, and is indicative of approximately three-quarters of the circumference of the tire represented by the outer ring being within tolerance for a given uniformity characteristic. The remaining 5 segments, and the white spaces spaced therebetween, are indicative of the remaining approximately one-quarter of the circumference of the tire represented by the outer ring being without tolerance for the given uniformity characteristic. The second ring inward on this polar plot 202 is solid black, all the way around, indicative of the uniformity characteristic for the tire associated with the second ring being within tolerance all around its circumference.

The rings of the polar plots are also presented in a manner that bears an "intuitive" relationship to circumferential positions on the tire, from a reference point on the tire. In other words, a position at the top (as viewed) of a ring represents the reference point on the tire associated with that ring, and a position at the right (as viewed) of a ring represents a point on the tire which is at "3 o'clock", or ninety degrees (in a given direction) from the reference point, and so forth.

It is a key aspect of this invention that the components making up the tire are positioned in a repeatable manner on the build drums, in the mold cavities and on the force variation machines. In other words, that a reference point on the tire always corresponds to a given position in the respective build drum, mold cavity and force variation machine.

Looking at the display 200, it is readily noted that the polar plot 202 associated with Build Drum #1 (102) appears markedly different than the polar plot 212 associated with Mold Cavity #4 (118), the former (202) having rings that change noticeably in appearance between the "9 o'clock" and "12 o'clock" positions, the latter (212) having rings that change in appearance between the "6 o'clock" and "9 o'clock" positions. The operator, noticing the lack of uniformity in the polar plot 202 can, using a conventional pointing mechanism such as a mouse or a trackball, move a cursor 220 to select the polar plot 202 for more detailed viewing (enlargement).

Figure 3:
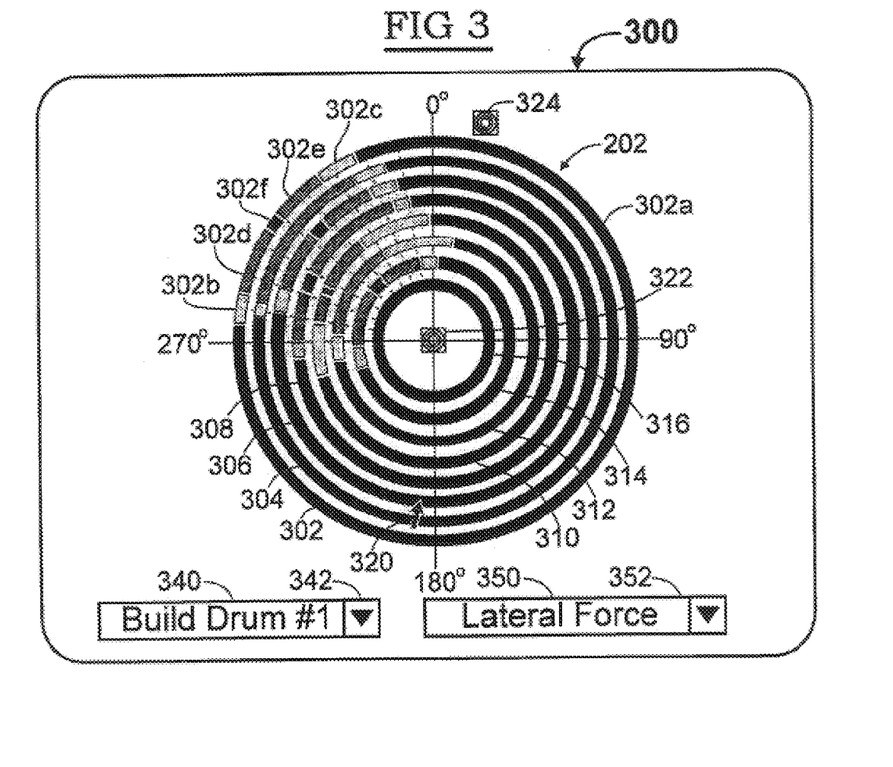
FIG. 3 is a facsimile of another exemplary image such as would be displayed on the monitor of the system of FIG. 1.

FIG. 3 shows a enlarged display 300 of the polar plot 202 such as would be displayed and viewed on the monitor 136 as a result of the operator "clicking" on the polar plot 202 in the screen image 200, for enlargement (more detailed viewing). The polar plot 202 remains in the form of a plurality of rings 302–316, each ring associated with and representing the characteristic data for a number (e.g., eight) of tires assembled on Build Drum #1. At a glance, it is evident that various portions of the rings are shaded differently than other portion of the rings. The different shadings can represent different colors (e.g., blue, green, yellow, red) displayed on the monitor 136.

Before proceeding with a detailed discussion of FIG. 3, it should clearly be understood that the screen display shown in FIG. 3 can be integrated with the screen display shown in FIG. 2. In other words, the detailed, enlarged view of the polar plot 202 can be viewed simultaneously with the views of the polar plots 202–216 shown in FIG. 2, by appropriately positioning and sizing of images on the screen.

As shown in FIG. 3, the polar plot 202 comprises eight concentric rings 302, 304, 306, 308, 310, 312, 314 and 316, each ring representing characteristic data for a given tire that was assembled on Build Drum #1. The characteristic data for the most recently manufactured tire is shown as the outermost ring 302. The characteristic data for the next previously manufactured tire is shown as the next outermost ring 304, and so forth, the innermost ring 316 representing the characteristic data for the least recent of the eight tires being viewed in the polar plot 202.

As new tires are manufactured (on Build Drum #1) and their characteristic data measured (on one of the Force Variation Machines), the characteristic data for that tire takes the place of the outermost ring 302 on the polar plot 202, the existing rings 302–316 shrink (index to the next inner position), and the representation (316) disappears. In other words, the ring 302 moves to the position previously occupied by the ring 304, the data for the newly-manufactured tire taking its place and being represented as a new ring (not shown). The ring 304 moves to the position previously occupied by the ring 306, the ring 306 moves to the position previously occupied by the ring 308, the ring 308 moves to the position previously occupied by the ring 310, the ring 310 moves to the position previously occupied by the ring 312, the ring 312 moves to the position previously occupied by the ring 314, the ring 314 moves to the position previously occupied by the ring 316, and the ring 316 disappears.

This "updating" of the polar plot can be performed either statically or dynamically. In other words, the enlarged polar plot can be a "freeze frame" view of the characteristic data for eight tires, or can be updated "on the fly" as characteristic data for a new most recently manufactured tire is captured by the computer.

An optional feature of the present invention is that a cursor 320 can be positioned on an inner "icon" 322 to "recall" the display of the characteristic data for a "previous" tire that is no longer being displayed as one of the eight rings on the polar plot 202, having disappeared into the interior of the plot. In such a case, the rings would move outward, the characteristic data for the least recently manufactured tire would be re-displayed on the inner ring of the plot, and the characteristic data ring for the most recently manufactured being "bumped off" the outside of the plot. This condition could be indicated by an icon 324 appearing outside the outer ring of the plot. Then, in order to return to the previous display, with the characteristic data ring for the most recently manufactured being "restored" to its previous position as the outer ring of the plot, the operator could click either on the icon 324, on an "UNDO" button, or the like. Implementing such features is well within the grasp of one having ordinary skill in the art to which the present invention most nearly pertains, in light of the teachings presented herein.

In essence, the icon 322 and 324 are both indicative of the fact that characteristic data for tires in addition those being displayed as rings on the polar plot is available for display.

The outermost ring 302 represents characteristic data for a given tire which was assembled on Build Drum #1. As shown, a substantial portion 302a of the ring 302 is shaded (or colored, e.g., BLUE) to indicate that the characteristic data for that tire is within a first range between the circumferential positions of approximately 335°, past 0°, to approximately 275°. Portions 302b and 302c of the ring 302 are dissimilarly shaded (or colored, e.g., GREEN), indicating that the characteristic data for that tire is within a second range at the circumferential positions of approximately 275°–285° and 325°–335°, respectively. Portions 302d and 302e of the ring 302 are dissimilarly shaded (or colored, e.g., YELLOW), indicating that the characteristic data for that tire is within a third range at the circumferential positions of approximately 285°–305° and 310°–335°, respectively. A portion 302f of the ring 302 is dissimilarly shaded (or colored, e.g., RED), indicating that the characteristic data for that tire is within a fourth range at the circumferential positions of approximately 305°–310°.

Similar segmentation can be observed for the rings 304–316. However, note for example that the ring 304 has only four, rather than seven dissimilarly shaded (or colored) segments, there being no portion of that ring 304 indicating that the tire represented by that ring 304 has characteristic data in the fourth range of values. The next ring 306 is substantially similar to the ring 302 in that it has seven portions, and has characteristic data in each of the four ranges.

A relevant "title" is also displayed in the screen image 300. For example, "Build Drum #1" and "Lateral Force", in which case the polar plot 202 simultaneously displays characteristic data of lateral force for eight tires assembled on build drum #1 (102). This provides the operator with an overview of how defects in the characteristic parameters of the tires are related (if at all) to a particular one of the build drums or mold cavities in the manufacturing cell 100, in response to which a given drum or cavity that appears to be propagating defects in the tires can be taken off line and repaired or replaced.

Figure 3A:
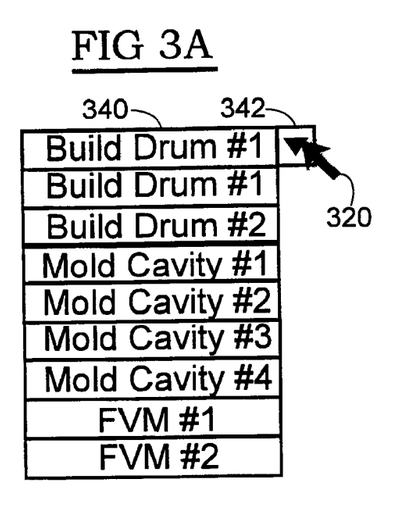
FIG. 3A facsimile of a portion of an exemplary image such as would be displayed on the monitor of the system of FIG. 1.
Figure 3B:
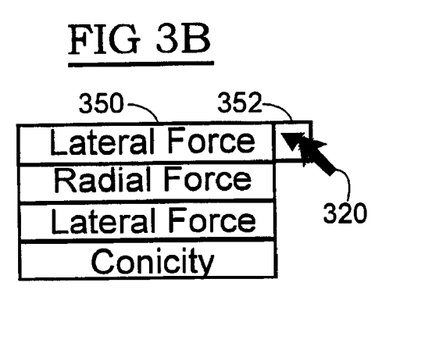
FIG. 3B is a facsimile of another portion of an exemplary image such as would be displayed on the monitor of the system of FIG. 1.

To view an enlarged polar plot for another of the drums or cavities, the operator can move the cursor to the thumbnail (202–212) for that drum or cavity, and click upon it to enlarge it. Alternatively, dropdown menus (lists) or the like (e.g., flyout menus) may be provided, as follows. The text "Build Drum #1" appears as a menu entry in a menu box 340. Next to the menu box 340 is a button icon 342. By moving the cursor 320 to the button icon 342, a list of menu items drops down below the box, as illustrated in FIG. 3A. By clicking on a menu entry, such as "Mold Cavity #2", an enlarged polar plot (208) for the tires manufactured in mold cavity #2 will be displayed. Similarly, the text "Lateral Force" appears as a menu entry in a menu box 350. Next to the menu box 350 is a button icon 352. By moving the cursor 320 to the button icon 352, a list of menu items drops down below the box, as illustrated in FIG. 3B. By clicking on a menu entry, such as "Radial Force" the enlarged polar plot (e.g., 202) being displayed will display the characteristic data of radial force for the eight tires in the current polar plot. It is well within the grasp of one having ordinary skill in the art to which the present invention most nearly pertains to provide the aforementioned and other features in the software running the computer 130, in light of the teachings provided herein.

Figure 4:
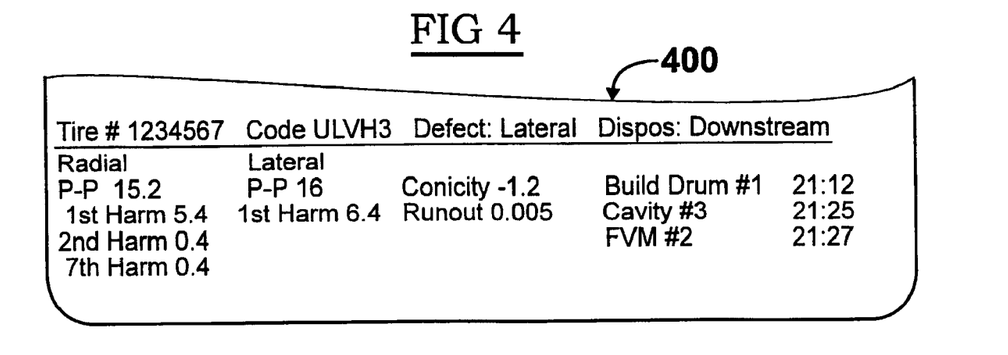
FIG. 4 is a facsimile of another portion of an exemplary image such as would be displayed on the monitor of the system of FIG. 1.

If the operator is interested in calling up (being presented with) more detailed information (e.g., raw data) about a given tire being represented in the polar plot 202, they can position the cursor 320 on the associated ring (e.g., 306) representing that tire and "click" on that ring resulting in a new screen display 400, shown in FIG. 4. As was the case with the displays 200 and 300 of FIG. 2 and FIG. 3, respectively, the display of FIG. 4 can be integrated into the other two displays by appropriate sizing of display areas in the image on the monitor screen 136.

The display of FIG. 4 is textual in nature, and provides the operator with raw data relating to the tire of interest. For example, as shown in the Figure ("Harm" is an abbreviation for "Harmonic", "Dispos" is an abbreviation for "Disposition"):

| Tire #1234567 | Code ULVH3 Defect: Lateral Disposition: Downstream |
|---|---|
| Radial | Lateral |
| P-P 15.2 | P-P 16  Conicity −1.2  Build Drum #1  21:12 |
| 1st Harm 5.4 | 1st Harm 6.4  Runout 0.0005  Cavity #3  21:25 |
| 2nd Harm 0.4 | FVM #2  21:27 |
| 7th Harm 0.4 | |

From this information which is presented to the operator, it can be ascertained that a particular tire of interest (#1234567) was:

(a) assembled on Build Drum #1 (102) at time 21:12;

(b) molded and cured in Mold Cavity #3 (116) at time 21:25;

(c) tested on Force Variation Machine #2 (124) at time 21:27;

and was determined (by critical parameter measuring) to have:

(d) a radial force peak to peak (P—P) of 15.2 pounds (lbs.);

(e) a first harmonic of radial force of 5.4 lbs.;

(f) a second harmonic of radial force of 0.4 lbs.;

(g) a seventh harmonic of radial force of 0.4 lbs.;

(h) a lateral force (P—P) of 16 lbs.;

(i) a first lateral harmonic of 6.4 lbs.;

(j) a conicity of −1.2 lbs.; and (k) a runout of 0.0005 inches.

Any relevant information may be displayed in this step (400) that helps the operator determine the quality of the tire.

The characteristic data for tires can be represented graphically in other than polar plots.

Figure 5:
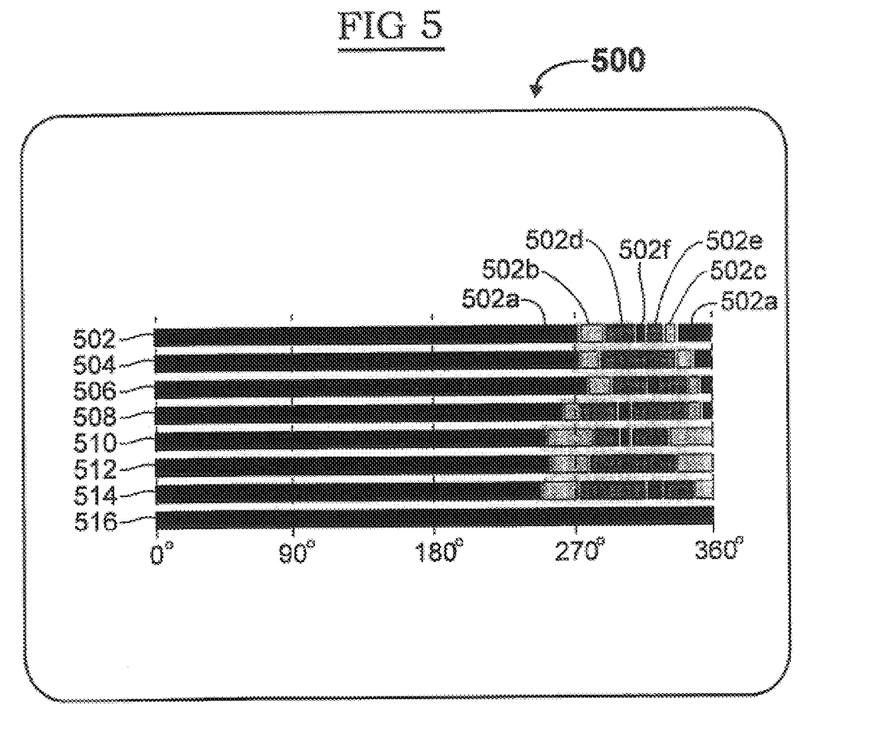
FIG. 5 is a facsimile of an exemplary image such as would be displayed on the monitor of the system of FIG. 1, in another embodiment of the invention.

For example, FIG. 5 (compare FIG. 3) illustrates an exemplary image 500 (compare 300) such as would be displayed and viewed on the monitor 136. The image 500 is in the overall form of an rectangle and has a number (e.g. eight) of horizontal bands (bars) 502–516 (compare the rings 302–316), each band corresponding to and graphically displaying characteristic data for a given tire which is manufactured in the manufacturing cell 100. A topmost band 502 (compare 302) corresponds to the most recently manufactured tire on a given component (e.g., DRUM 1). A bottommost band 516 (compare 316) corresponds to the least recently manufactured tire on the component. As is evident, the visual appearance of a number of the bands 502–516 varies from left-to-right. A position at the left (as viewed) end of a given band corresponds to the 0° position on the tire for which data is being graphically displayed. A position at the right (as viewed) end of a given band corresponds to the 360° position on the tire for which data is being graphically displayed. Intermediate positions corresponding to 90°, 180° and 270° are shown as dashed vertical lines on the display.

Looking briefly at a given one 502 of the bands 502–516, it is evident that its visual appearance changes between approximately the 270° position and the 360° position. As shown, a substantial portion 502a (compare 302a) of the ring 502 is shaded to indicate that the characteristic data for that tire is within a first range between the circumferential positions (on the tire itself) of approximately 335°, past 0°, to approximately 275°. Portions 502b (compare 302b) and 502c (compare 302c) of the ring 302 are dissimilarly shaded, indicating that the characteristic data for that tire is within a second range at the circumferential positions (on the tire itself) of approximately 275°–285° and 325°–335°, respectively. Portions 502d (compare 302d) and 502e (compare 302e) of the ring 302 are dissimilarly shaded, indicating that the characteristic data for that tire is within a third range at the circumferential positions (on the tire itself) of approximately 285°–305° and 310°–335°, respectively. A portion 502f (compare 302f) of the ring 302 is dissimilarly shaded (or colored, e.g., RED), indicating that the characteristic data for that tire is within a fourth range at the circumferential positions (on the tire itself) of approximately 305–310°.

In the manner in which the rings of the polar plots can have graphical variations other than dissimilarly colored or shaded portions, the bands 502–516 could vary in thickness at different positions as a function of the characteristic data for that tire. Or, individual bands could be thin lines which increase or decrease in vertical position as a function of the characteristic data for that tire. Or, a combination of any of color, shading, thickness, and vertical position can be used to represent variations in characteristic data for the tire. All of these possibilities are readily noted by a human operator, and are suitably collectively termed differences in the "visual appearance" of the rings of the polar plots.

It is within the scope of the invention that the bands (502–516) could be represented in other than a rectangular array, each band having the same width (left-to-right, as viewed in FIG. 5). For example, the topmost band (502) representing the most recently manufactured tire could be wider than the bottommost band (516) representing the least recently manufactured tire, and the bands (504–514) between the top and bottom bands could vary linearly in width from wide to narrow, resulting in an overall inverted triangular configuration.

As can now be appreciated from the above description, there has been provided in accordance with this invention method and apparatus for providing an operator of a tire manufacturing cell results of characteristic data measurement in near real time to the processes used to create the tires. In this manner, the operator can quickly react to process upsets such as bad tire stock, the positioning of splices, deformation of components, and the like.

While the invention has been described in combination with embodiments thereof, it is evident that many alternatives, modifications, and variations will be apparent to those skilled in the art in light of the foregoing description. Accordingly, it is intended to embrace all such alternatives, modifications and variations as fall within the spirit and scope of the appended claims.

What is claimed is:

1. A method of displaying characteristic data associated with a plurality of tires manufactured in a manufacturing cell having at least one build drum, at least one mold cavity, and at least one characteristic data measuring machine, comprising the steps for each one of the plurality of tires:

assigning a unique tracking number to each tire being manufactured in the manufacturing cell;

storing in memory which one of the at least one build drums, at least one mold cavities and at least one characteristic data measuring machines the tire was assembled, molded and measured on;

storing in memory the characteristic data gathered from the measuring machine for the tire; and displaying on a computer screen, in graphic form, the characteristic data for the tire using differences in visual indications to indicate data falling within at least two different ranges of values at each circumferential position of the tire.

2. The method of claim 1 including the step of selecting the differences in visual indications from the group consisting of shading, coloring, thickness and position.

3. The method of claim 1 further comprising the step of displaying the characteristic data for a number of tires in a single polar plot, the data for each of the number of tires being represented by a one of a number of concentric rings.

4. The method of claim 3 including the steps of: representing an outermost of the number of rings as the characteristic data for the most recently manufactured of the number of tires; and representing an innermost of the number of rings as the characteristic data for the least recently manufactured of the number of tires.

5. The method of claim 4 further including the step of providing an icon indicating that characteristic data for tires in addition to that data being displayed as rings on the polar plot is available for display.

6. The method of claim 1 further including the step of displaying a number of polar plots, each displaying data for a number of tires that were assembled on a given one of the at least one build drums, at least one mold cavities and at least one characteristic data measuring machines.

7. The method of claim 6 further including the steps of:
   selecting a given one of the number of polar plots; and
   causing the selected one of the number of polar plots to be enlarged on the screen.

8. The method of claim 7 further including the step of displaying the enlarged selected polar plot on the same screen image as the number of polar plots.

9. The method of claim 7 further including the steps of:
   selecting a given one of the rings of the enlarged selected polar plots; and
   causing data to be displayed on the screen, said data being associated with the selected one of the rings of the enlarged selected polar plot, hence a selected one of the tires that was manufactured in the manufacturing cell, said data being selected from the group consisting of tire tracking number, radial force, harmonic data of the radial force, lateral force, harmonic data of the lateral force, conicity, runout, the build drum used to assemble the tire, the time that the tire was resident on the build drum, the mold cavity used to mold the tire, the time that the tire was resident in the mold cavity, and the machine used to collect the characteristic data for the tire.

10. The method of claim 7 including the step of displaying the number of polar plots having differences in visual indications which are different than the differences in visual indications which are being displayed for the enlarged polar plot.

11. The method of claim 1 further including the step of displaying the characteristic data for a number of tires as a number of bars displayed one above the other, the data for each of the number of tires being represented by a one of a number of bars.

12. The method of claim 11 including the steps of:
   representing the characteristic data for the most recently manufactured of the number of tires with a topmost one of the number of bars; and
   representing the characteristic data for the least recently manufactured of the number of tires a bottommost one of the number of bars.

* * * * *